United States Patent
Mather

(10) Patent No.: US 10,125,233 B2
(45) Date of Patent: Nov. 13, 2018

(54) TRIPLE SHAPE MEMORY COMPOSITE FOAMS

(71) Applicant: Patrick T. Mather, Lewisburg, PA (US)

(72) Inventor: Patrick T. Mather, Lewisburg, PA (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 6 days.

(21) Appl. No.: 15/503,065

(22) PCT Filed: Aug. 11, 2015

(86) PCT No.: PCT/US2015/044649
§ 371 (c)(1),
(2) Date: Feb. 10, 2017

(87) PCT Pub. No.: WO2016/025476
PCT Pub. Date: Feb. 18, 2016

(65) Prior Publication Data
US 2017/0233542 A1    Aug. 17, 2017

Related U.S. Application Data

(60) Provisional application No. 62/035,655, filed on Aug. 11, 2014.

(51) Int. Cl.
   *C08J 9/00* (2006.01)
   *C08L 67/04* (2006.01)
   *C08L 63/00* (2006.01)

(52) U.S. Cl.
   CPC ............. *C08J 9/0061* (2013.01); *C08L 63/00* (2013.01); *C08L 67/04* (2013.01); *C08J 2363/02* (2013.01); *C08J 2367/04* (2013.01); *C08J 2463/02* (2013.01); *C08J 2467/04* (2013.01)

(58) Field of Classification Search
   CPC .. C08J 9/0061; C08J 2363/02; C08J 2367/04; C08J 2463/02; C08J 2467/04; C08L 63/00; C08L 67/04
   See application file for complete search history.

(56) References Cited

U.S. PATENT DOCUMENTS

| 2002/0136848 A1 | 9/2002 | Yoshii et al. |
| 2010/0062211 A1 | 3/2010 | Kawazoe et al. |
| 2011/0259517 A1 | 10/2011 | Behl et al. |

FOREIGN PATENT DOCUMENTS

WO    2013/050782 A2    4/2013

OTHER PUBLICATIONS

Zhang et al., "A bioactive "self-fitting" sape memory polymer scaffold with potential to treat cranio-maxillo facial bone defects," Acta Biomaterialia, 10, 2014.*
Zhang et al., "Porous organic-inorganic shape memory polymers," Polymer 53, 2012.*
International Search Report and Written Opinion Form PCT/ISA/220, International Application No. PCT/US2015/044649, p. 1-7, International Filing Date Aug. 11, 2015, dated Nov. 4, 2015.
The Royal Society of Chemistry 2014; Soft Matter; Properties of triple shape memory composites prepared via polymerization-induced phase separation. pp. 3112-3121, Amir H. Torbati, Hossein Birjandi Nejad, Mileysa Ponce, James P. Sutton and Patrick T. Mather.

* cited by examiner

*Primary Examiner* — Irina S Zemel
(74) *Attorney, Agent, or Firm* — Bond Schoeneck and King PLLC; David Nocilly; George McGuire

(57) ABSTRACT

A triple shape memory polymeric foam that is open cell in nature and features a two phase, crosslinked SMP with a glass transition temperature of one phase at a temperature lower than a melting transition of the second phase. The resulting soft material features high fidelity, repeatable triple shape behavior, and is useful for complex deployment using a combination of foam compression and bending.

14 Claims, 19 Drawing Sheets ively employed, and have been used in a wide range of applications including smart textiles and apparel, biomedical devices, and deployable aircraft structures. The shape-changing functionality of SMPs is achieved by memorization of a permanent shape through physical or chemical crosslinks, and programming of an arbitrary temporary shape by deformation and subsequent immobilization of the polymer chains. Upon mobilization of the polymer chains through application of a stimulus, such as heat, the SMP object changes shape from the programmed temporary state to the memorized permanent state, driven by entropic elasticity.

TRIPLE SHAPE MEMORY COMPOSITE FOAMS

CROSS-REFERENCE TO RELATED APPLICATIONS

This application claims priority to U.S. Application No. 62/035,655, filed on Aug. 11, 2014.

BACKGROUND OF THE INVENTION

1. Field of the Invention

The present invention relates to shape memory polymers and, more particularly, to a shape memory foam characterized by two temporary shapes and one permanent shapes.

2. Description of the Related Art

Shape memory polymers (SMPs) are a class of smart materials that can be designed to undergo programmed changes in shape and stiffness in response to an external stimulus, such as heat, light, magnetic field, and pH. Thermally triggered SMPs are the most extensively employed, and have been used in a wide range of applications including smart textiles and apparel, biomedical devices, and deployable aircraft structures. The shape-changing functionality of SMPs is achieved by memorization of a permanent shape through physical or chemical crosslinks, and programming of an arbitrary temporary shape by deformation and subsequent immobilization of the polymer chains. Upon mobilization of the polymer chains through application of a stimulus, such as heat, the SMP object changes shape from the programmed temporary state to the memorized permanent state, driven by entropic elasticity.

Recently, shape memory functionality has been married with the high compressibility and low density of porous materials to develop SMP foams. While some studies have reported on closed-cell SMP foams, most studies to-date have focused on open-cell foams based on polyurethane or epoxy chemistries. These foams are well-suited for applications where large expansion ratios are required from a light-weight, compact packaged state. For instance, Solowski and colleagues developed cold-hibernated elastic memory foams (CHEM) for deployable space aircraft structures. These polyurethane-based SMP foams had high full/ stowed volume ratios of up to 40 and were capable of being stored in the cold hibernated condition for over 1 year. SMP epoxy-based foams with increased electrical conductivity and large compressibility have also been reported.

SMP foams have also recently received increased attention for biomedical applications, such as the use of CHEM polyurethane-based foams as an occlusive material for embolization of aneurysms. It was found that CHEM foams were able to successfully occlude internal maxillary arteries in a dog model, although some residual necks and recurrences were reported. A laser-triggered SMP foam was also developed as an aneurysm occlusion device. There, an SMP comprised of hexamethylene diisocyanate, N,N,N',N'-tetrakis(2-hydroxypropyl)eythlenediamine, and triethanolamine with a glass transition temperature ($T_g$) of 45° C. was placed in a PDMS basilar-necked aneurysm model and deployed by laser activation. The SMP foam was able to fully expand within 60 s of activation. With recent developments in polymer systems with triggering temperatures near body temperature, SMP foams with potential for studies under physiological conditions have also been enabled. For instance, a poly(ε-caprolactone)-co-poly(ethylene glycol) SMP foam capable of expanding once hydrated at 37° C. can be used for cell mechanobiology studies.

A limitation of current SMP foams is the inability to prescribe both the programmed and recovered shapes, as the recovered shape is restricted to the permanent, as-fabricated shape of the foam. Triple shape memory polymers (TSMPs) offer one way to overcome this limitation, where control over two temporary shapes can be achieved. As opposed to conventional SMPs that feature one transition temperature, TSMPs possessing two separate transition temperatures enable programming of two independent temporary shapes. TSMPs can be programmed to undergo two controlled shape changes, from temporary shape 1 to temporary shape 2, and from temporary shape 2 back to the permanent shape. This approach could be used to control both the programmed shape of an SMP foam (temporary shape 1) and the deployed state upon recovery (temporary shape 2).

Researchers have developed several approaches to fabricate TSMPs. The first triple shape memory effect was reported in two different polymer network systems where each had two distinct transition temperatures. TSMPs have also been developed using bilayer systems, where two epoxy dual-shape polymers with $T_g$ of 38 and 75° C. were bonded together to create a bimorph. Other approaches to TSMP fabrication and triggering have also recently been reported, such as a TSMP hydrogel that employed dipole-dipole interactions to achieve triple shape behavior. A supermolecular composite containing a SMP polyurethane and cholesteryl isonicotinate has been developed where the hydrogen bonding between the carboxyl groups of the polyurethane and the pyridine ring of the cholesteryl isonicotinate enable triple shape memory. Recent advances have also resulted in the development of TSMPs triggered through alternating magnetic fields rather than thermal triggering, as well as TSMPs with reversible actuation. The present invention have also developed a new approach to creating TSMPs by fabricating a composite system where poly(ε-caprolactone) electrospun fibers were embedded in an epoxy matrix. In that approach, triple shape memory was achieved through the two distinct transition temperatures: melt transition of the poly(ε-caprolactone) fibers and glass transition of the epoxy matrix. These composite-based triple shape polymers was referred to as triple shape memory composites (TSMCs).

One approach to easily fabricate TSMCs is to use polymerization induced phase separation (PIPS). There, two TSMC systems were fabricated differing in the nature of their fixing mechanisms. The first was a polypropylene glycol-epoxy/poly(ε-caprolactone) where the epoxy and poly(ε-caprolactone) begin as a miscible blend when mixed 80° C. and phase separate upon curing of the epoxy phase. This system achieved triple shape memory through a lower $T_g$ of the epoxy phase and a separate higher melt transition temperature of the poly(ε-caprolactone) phase. The second system incorporated a poly(ethylene oxide)-based epoxy rather than the polypropylene glycol-epoxy, and triple shape memory behavior was achieved through two separate melt transition temperatures of the epoxy and poly(ε-caprolactone) phases. Both materials exhibited good shape memory fixing and recovery of two temporary shapes, but with vastly different stiffness at room temperature and water sensitivity.

However, no one has been able to fabricate triple shape shame memory foams, which offer the potential for low density materials that can be triggered to deploy with a large volume change, unlike their solid counterparts that do so at near-constant volume. While examples of shape memory foams have been reported in the past, they have been limited to dual SMPs, i.e., polymers that feature one switching transition between an arbitrarily programmed shape and a single permanent shape established by constituent cross-links.

BRIEF SUMMARY OF THE INVENTION

The present invention comprises SMP foams possessing triple shape memory properties and a simple method for fabricating TSMC foams via polymer-induced phase separation (PIPS). Open-cell foams with two distinct transition temperatures and high compressibility were fabricated and their thermal and thermomechanical properties investigated. The materials were observed to feature high fidelity, repeatable triple shape behavior, characterized in compression and demonstrated for complex deployment by fixing a combination of foam compression and bending. The wettability of the foams was explored, revealing composition-dependent behavior favorable for future work in biomedical investigations. The ability of the TSMC foams to fix and recover two temporary shapes was demonstrated, and the results were compared to the triple shape behavior of films of the same composition.

More specifically, the triple shape memory polymer is a foam having an epoxy phase with a glass transition temperature and a thermoplastic phase having a melting temperature that are intermixed to form a continuous phase, wherein the continuous phase defines walls having a thickness of between 1 and 100 micrometers and pores having a diameter of between 100 and 1000 micrometers. The glass transition temperature of the epoxy phase is lower than the melting temperature of the thermoplastic phase. The epoxy comprises a copolymer of an aromatic diepoxide monomer and an aliphatic diepoxide monomer. The aromatic diepoxide monomer may be diglycidyl ether of bisphenol-A (DGEBA), and the aliphatic diepoxide monomer may be neopentyl glycol diglycidyl ether (NGDE). The thermoplastic phase may be poly($\epsilon$-caprolactone) (PCL). The polymer may also comprise a cross-linker, such as a polyetheramine and, more specifically, poly(propylene glycol) bis(2-aminopropyl ether.

The method of forming a triple shape memory polymer comprises the steps of, blending an aromatic diepoxide monomer and an aliphatic diepoxide monomer with a thermoplastic polymer, blending a cross-linker into the aromatic diepoxide monomer, the aliphatic diepoxide monomer, and the thermoplastic polymer, inserting the blended cross-linker, the aromatic diepoxide monomer, the aliphatic diepoxide monomer, and the thermoplastic polymer into a foam template, curing the blended cross-linker, the aromatic diepoxide monomer, the aliphatic diepoxide monomer, and the thermoplastic polymer in the foam template, and extracting the foam template to leave a triple shape memory polymer foam having walls with a thickness of between 1 and 100 micrometers and pores having a diameter of between 100 and 1000 micrometers.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
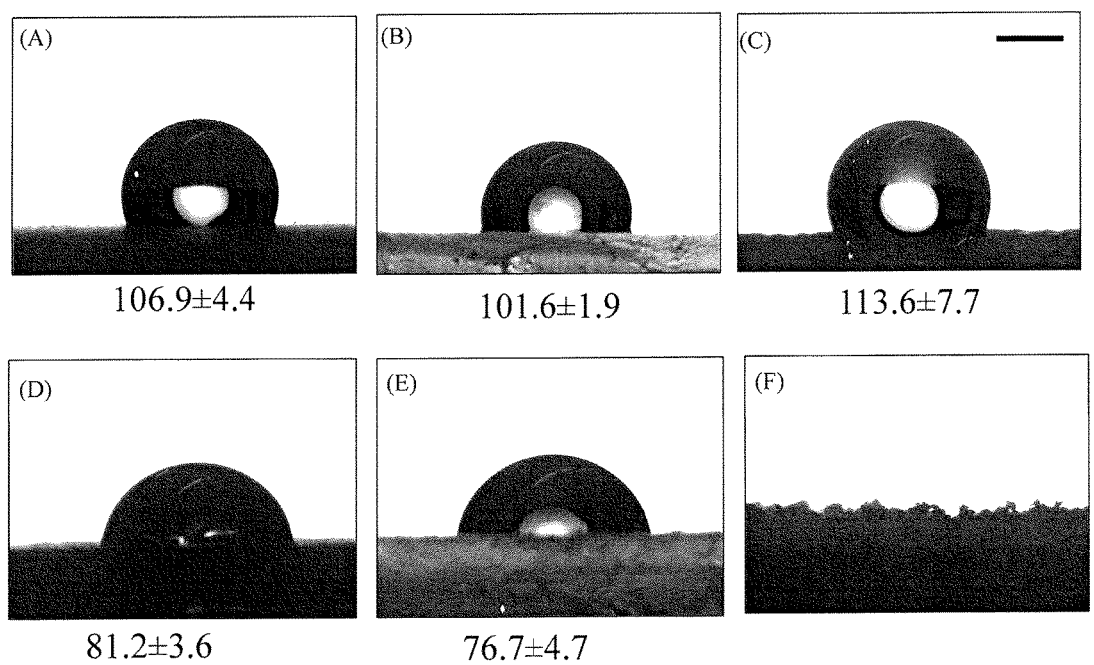

FIG. 4 are representative contact angle micrographs (and average contact angle measurements) of: (A) $D_1N_2J_{1.5}PCL10$ film, (B) $D_1N_2J_{1.5}$ film, (C) $D_1N_2J_{1.5}PCL10$ foam, (D) $N_2J_1PCL10$ film, (E) $N_2J_1$ film and (F) $N_2J_1PCL10$ foam. Water permeated into $N_1J_2PCL10$ foam in less than 30 s. The scale bar shown represents 1.0 mm for all images.

Figure 5:
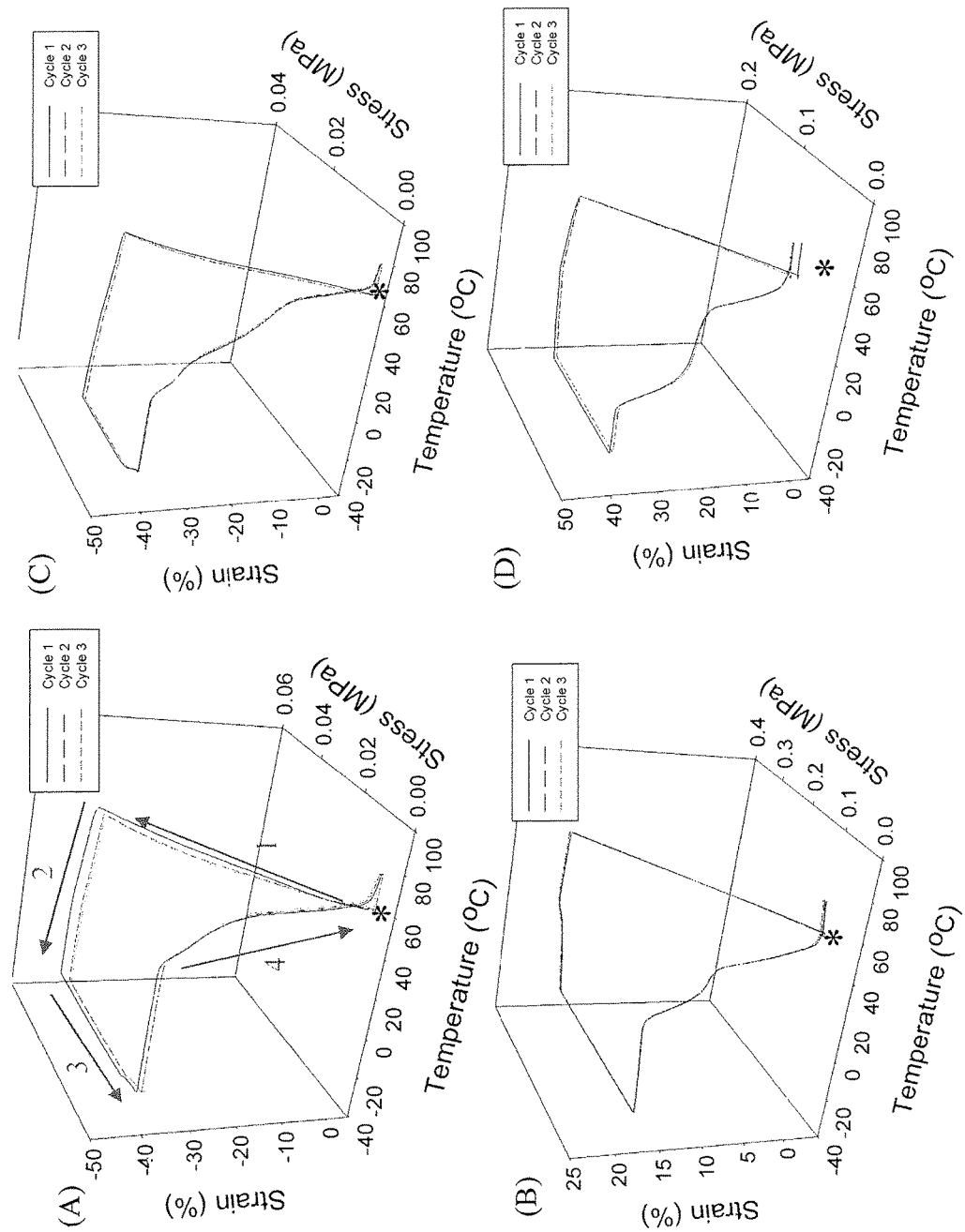

FIG. 5 is a series of graphs showing triple shape memory characterization of (A) $D_1N_2J_{1.5}PCL10$ foam, (B) $D_1N_2J_{1.5}PCL10$ film, (C) $N_2J_1PCL10$ foam and (D) $N_2J_1PCL10$ film using one-step fixing method. The beginning of the cycles are marked by the asterisk (*) symbol. Samples were deformed at 65° C. (deformation), cooled to −20° C. and unloaded (fixing), followed by continuous heating to 80° C. (recovery). The arrows denote the various stages, specifically (1) deformation, (2) fixing, (3) unloading, and (4) recovery.

Figure 6:
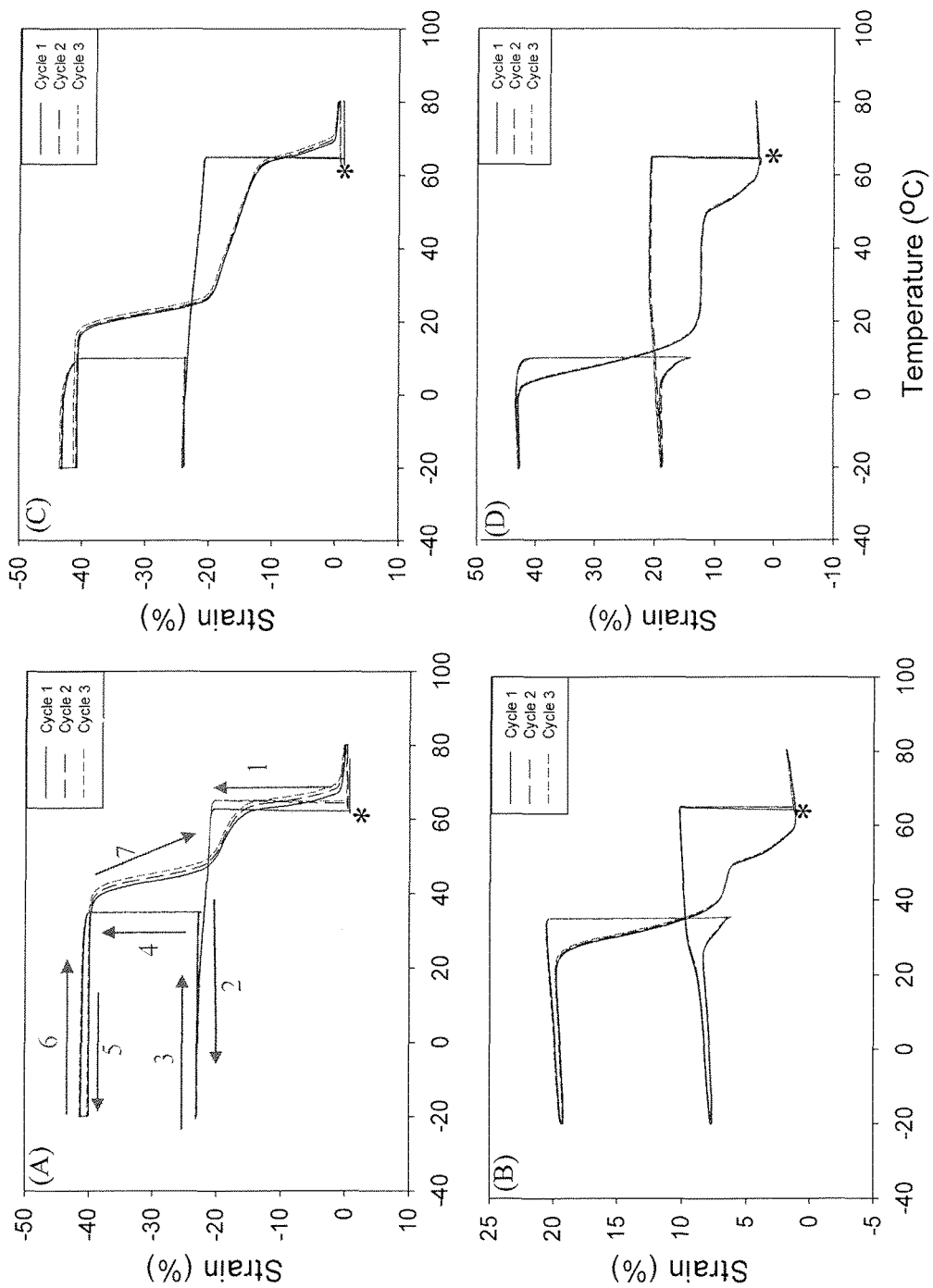

FIG. 6 is a series of graphs showing triple shape memory characterization of (A) $D_1N_2J_{1.5}PCL10$ foam, (B) $D_1N_2J_{1.5}PCL10$ film, (C) $N_2J_1PCL10$ foam and (D) $N_2J_1PCL10$ film using a two-step fixing method. Samples were deformed at 65° C., cooled to −20° C. and unloaded ($1^{st}$ fixing), heated to an intermediate temperature and deformed again, cooled to −10° C. ($2^{nd}$ fixing), followed by continuous heating to 85° C. (recovery). The beginning of the cycles are marked by the asterisk (*) symbol. The arrows denote the various stages of a shape memory cycle; specifically (1) deformation, (2) $1^{st}$ fixing, (3) $1^{st}$ unloading, (4) $2^{nd}$ fixing, (5) $2^{nd}$ unloading, and (6 and 7) recovery.

Figure 7:
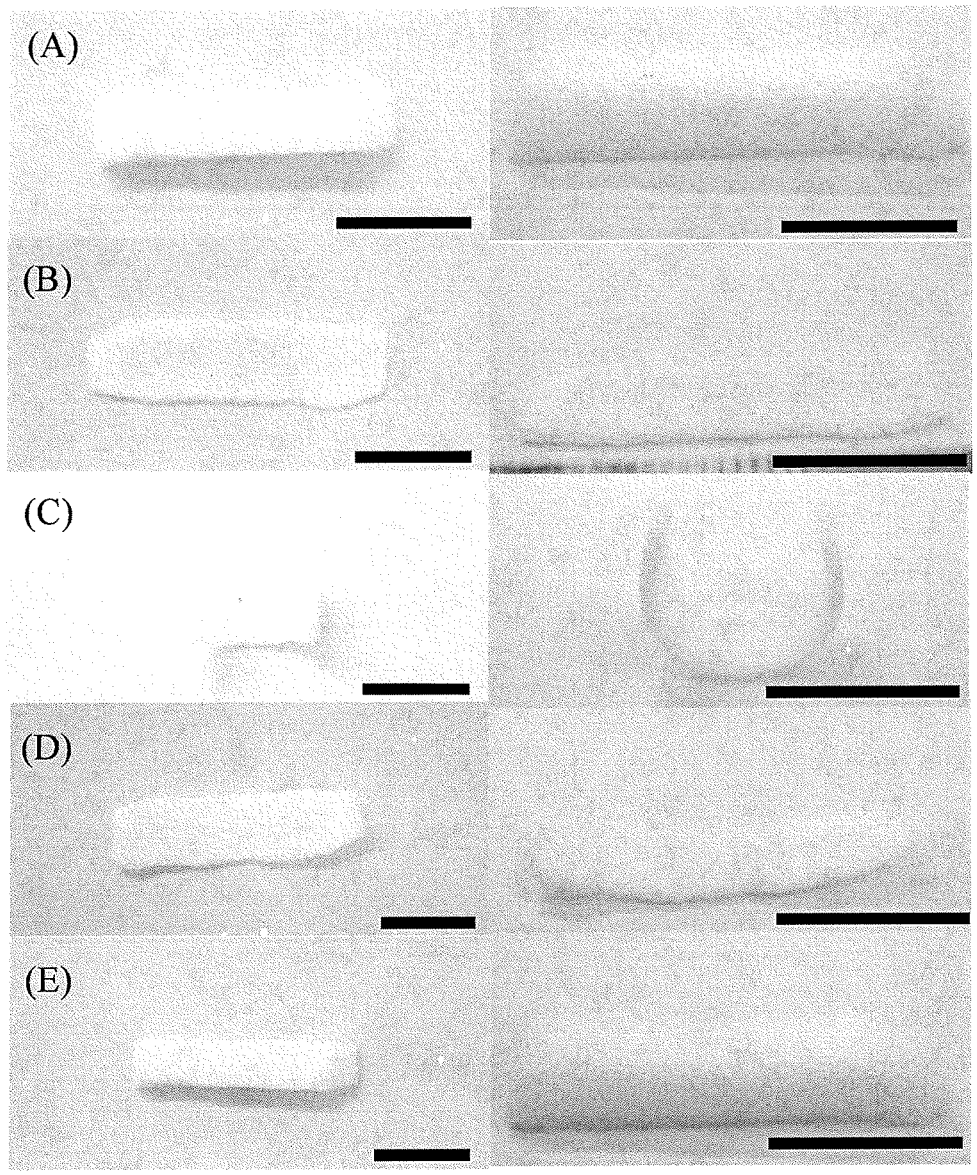

FIG. 7 is a series of photographs showing a triple Shape memory demonstration experiment where: (A) permanent shape at RT, (B) compressed to 70% at 80° C. strain and fixed, (C) curled to a "C" shape at 40° C. and fixed, (D) recovered at 40° C. and (E) recovered at 80° C. Left and right columns show top and side views, respectively. All scale bars represent 1 cm.

Figure 8:
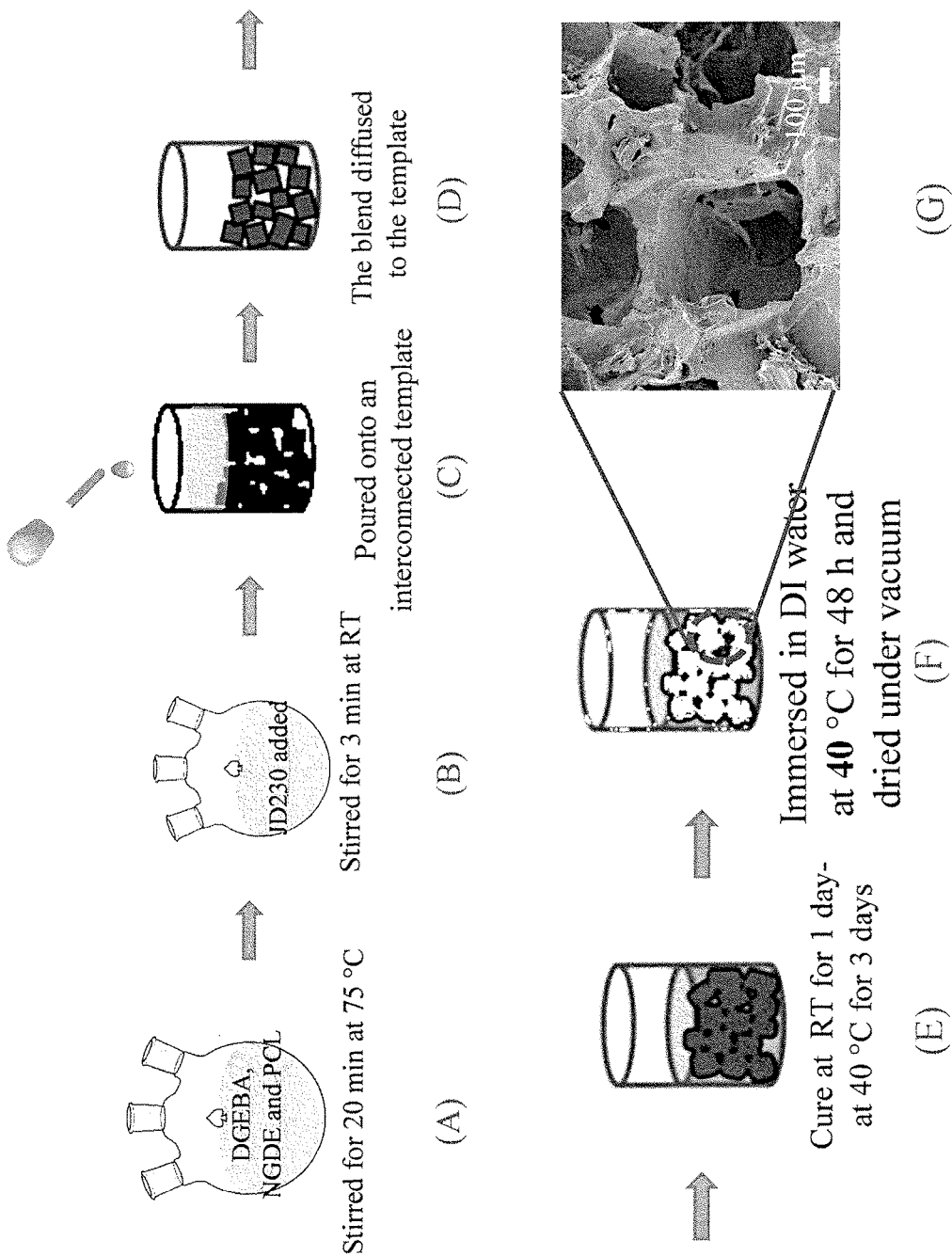

FIG. 8 is a step-by-step diagram for preparing the triple shape memory composites. Epoxy monomers and PCL were first mixed at 75° C. for 20 min until a clear, homogenous blends was achieved (A). Then the blend was cooled down to room temperature (RT) after which the crosslinker (JD230) was added (B). The blend was mixed again for another 2-3 min. The product, a low viscosity blend was then poured into a salt template (C) and was kept at ambient for 10 min followed by pulling light vacuum for an additional 10 min in to allow the blend to completely diffuse into the salt template and replace the air. The product was then cured at RT for 24 h followed by curing at 40° C. for 3 days after which the salt was distracted. After drying, the product was a porous interconnected foam (G).

Figure 9:
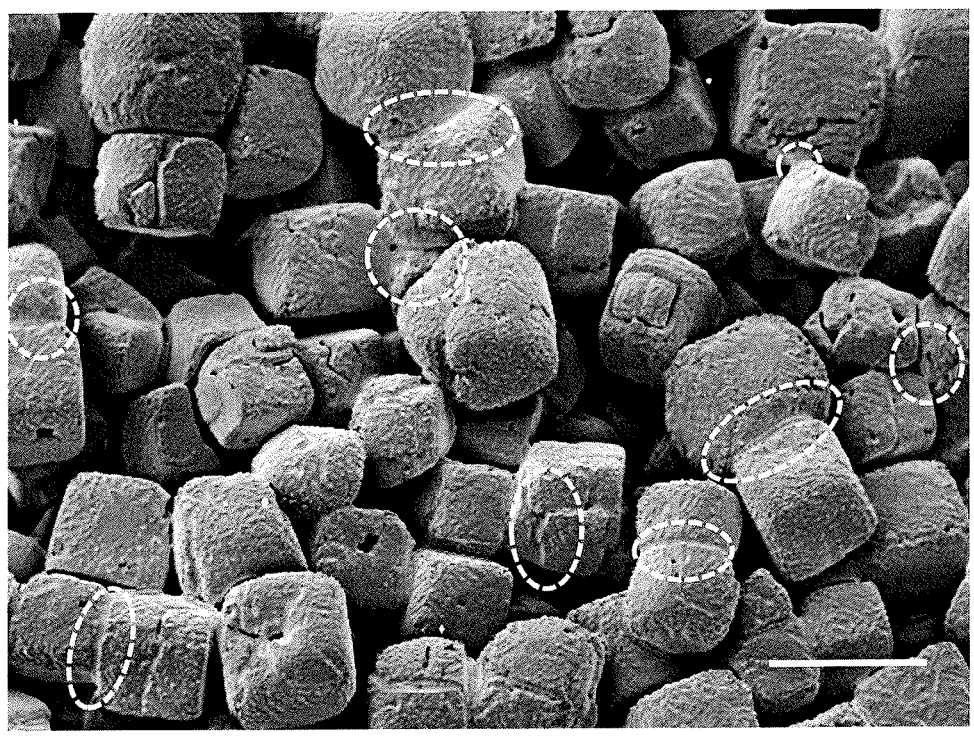

FIG. 9 is an SEM micrograph of NaCl templates used to fabricate the foams. To improve pore interconnectivity, salt was fused prior to polymer synthesis, as we now describe. About 6 g of salt with 150-300 μm diameter was added to a 20 ml high density polyethylene (HDPE) vial. The vial was then placed in a Styrofoam box (9.25×6.25×8.25 in) with the lid off in which a 2 L water at 40° C. was placed to provide a humidity saturated environment. The salt was kept in Styrofoam for 24 h during which the humidity of this chamber facilitates the fusion of the salt. The salt was then dried under light vacuum at RT for 24 h. Dashed lines represent some of the regions where salt crystals were welded together.

Figure 10:
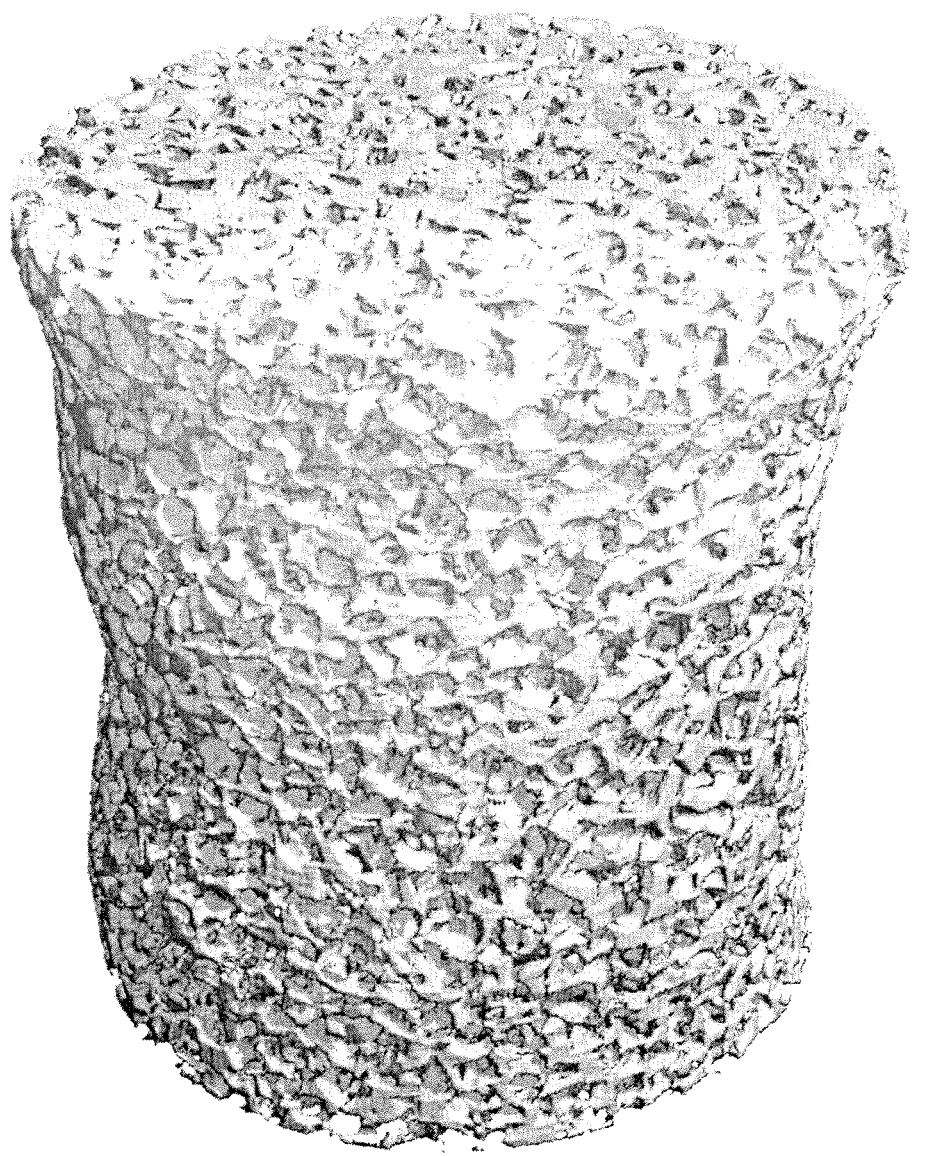

FIG. 10 is a representative MicroCT image of a triple shape memory foam. A 6.0 mm diameter and 9.0 mm thick disc was scanned using a Scanco Medical μCT40 scanner at voltage of 45 kV and current of 177 μA. Scanning parameters led to a nominal voxel resolution of 12 μm. Porosity of the foam was obtained to be about 73%. Scale bar represents 1.0 mm.

Figure 11:
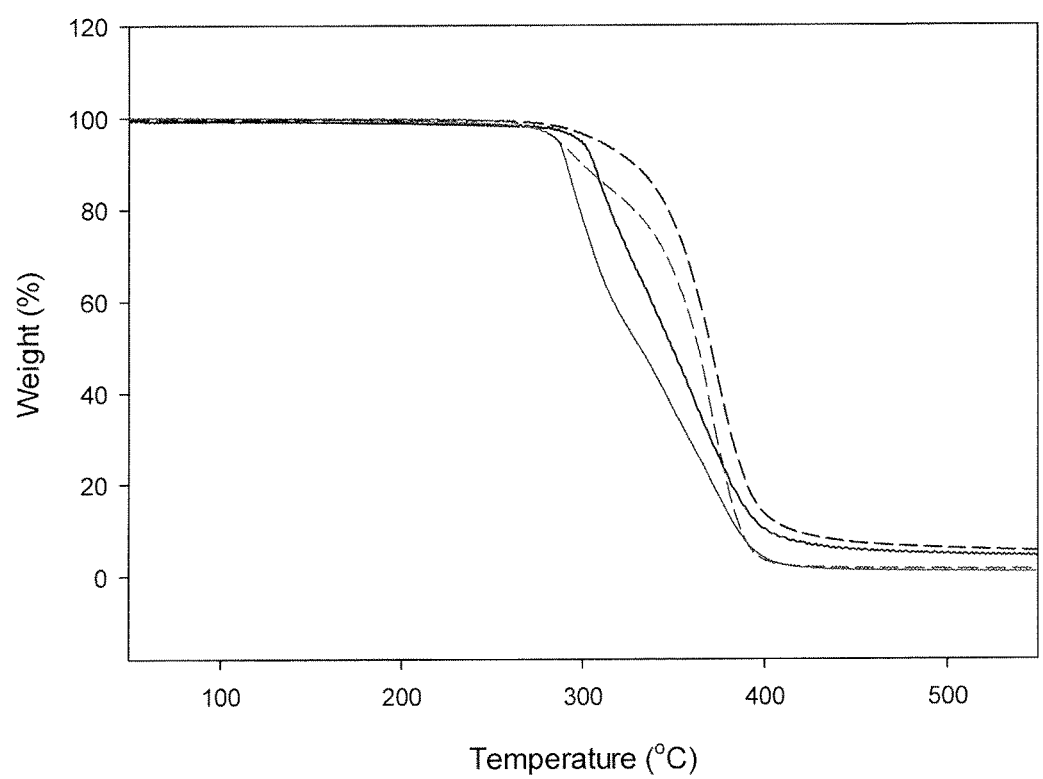

FIG. 11 are thermogram traces of (-) $D_1N_2J_{1.5}$PCL10 film, (--) $D_1N_2J_{1.5}$PCL10 foam, (-) $N_2J_1$PCL10 film and (--) $N_2J_1$PCL10 foam. The remaining weight % of each film and foam group are almost identical indicating successful extraction of salt.

Figure 12:
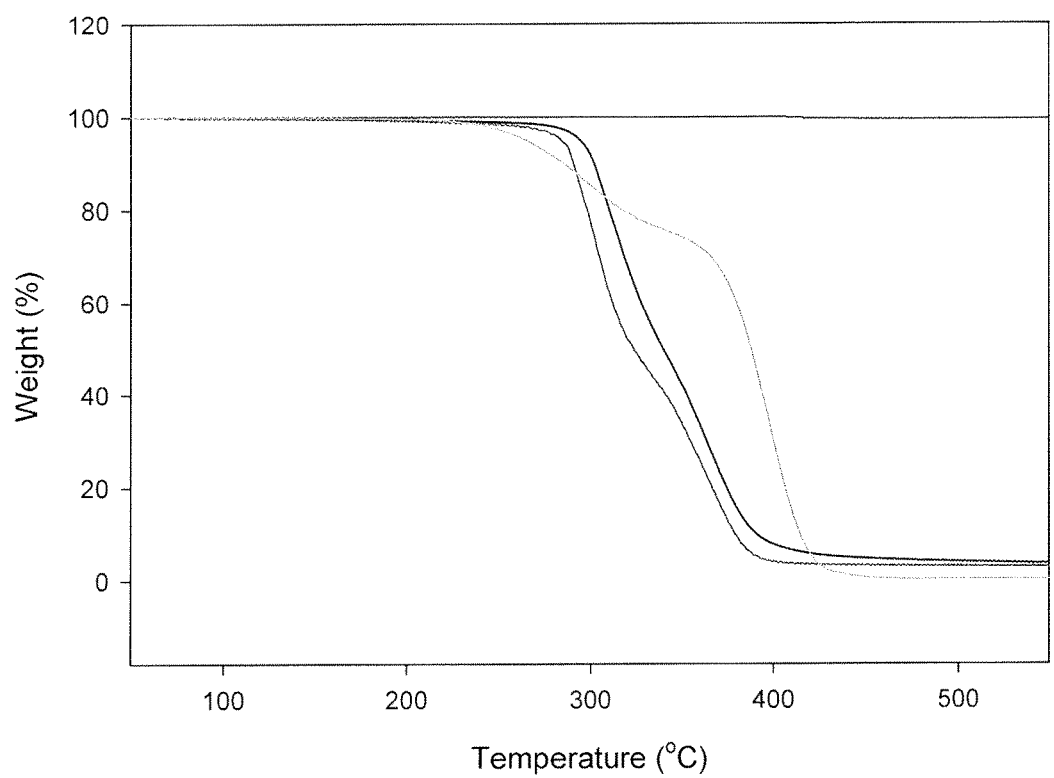

FIG. 12 are thermogram traces of (-) $D_1N_2J_{1.5}$ film, (-), (-) $N_2J_1$ film, (-) PCL and (-) NaCl template.

Figure 13:
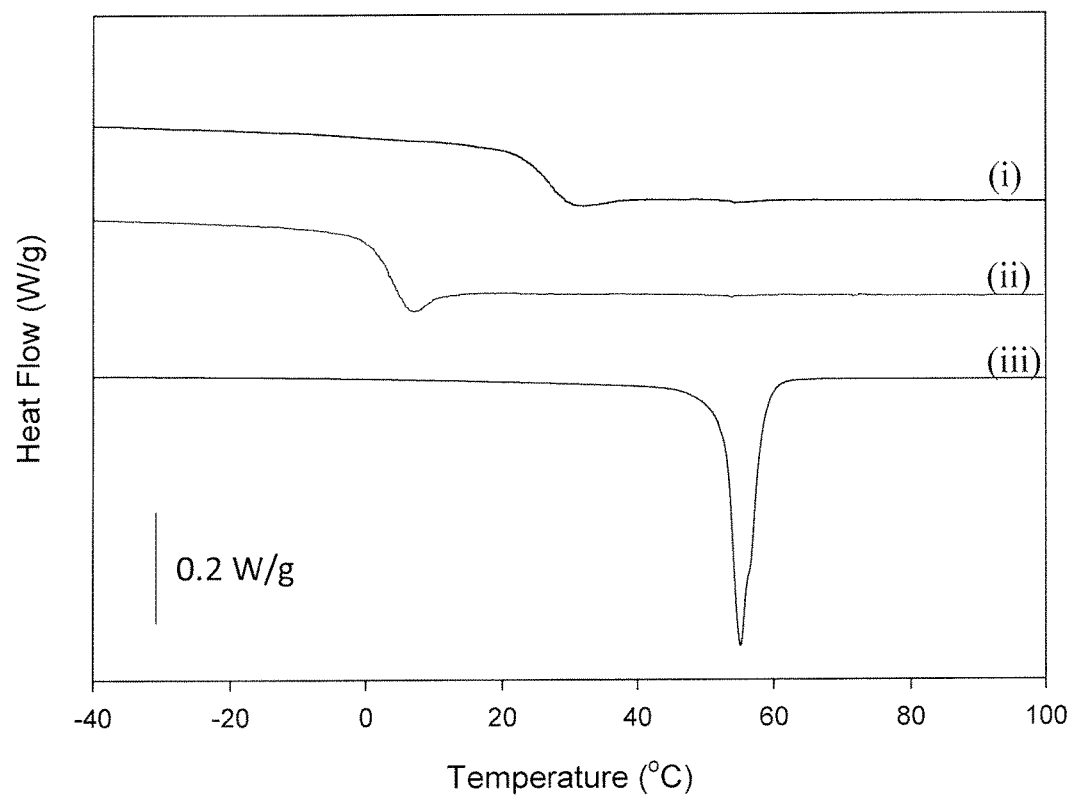

FIG. 13 are DSC thermograms ($2^{nd}$ heating cycle) of (i) $D_1N_2J_{1.5}$ film, (ii) $N_2J_1$ film and (iii) PCL. It is noted that the heat flow magnitude of the DSC thermogram for PCL was scaled down 5 times. Heating rates were 10° C./min and 5° C./min for heating and cooling, respectively.

Figure 14:
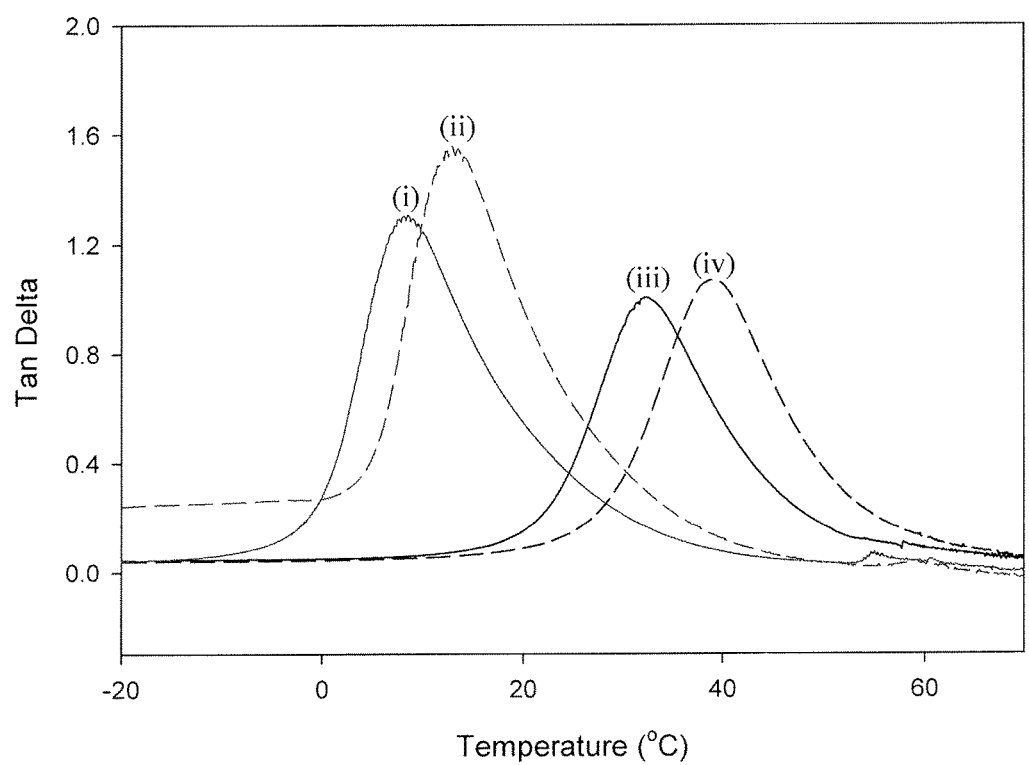

FIG. 14 are Tan Delta traces of (i) $D_1N_2J_{1.5}$PCL10 film, (ii) $D_1N_2J_{1.5}$PCL10 foam, (iii) $N_2J_1$PCL10 film and (iv) $N_2J_1$PCL10 foam.

Figure 15:
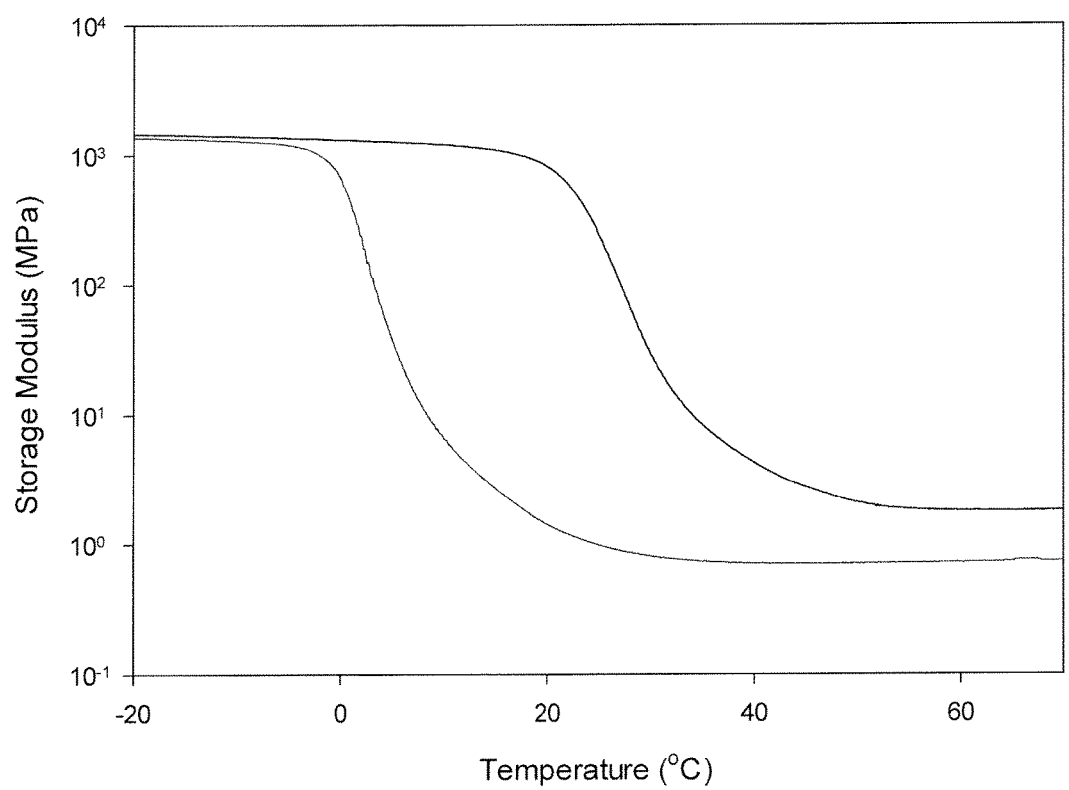

FIG. 15 are tensile storage modulus (E') traces of (-) $D_1N_2J_{1.5}$ film and (~) $N_2J_1$ film.

Figure 16:
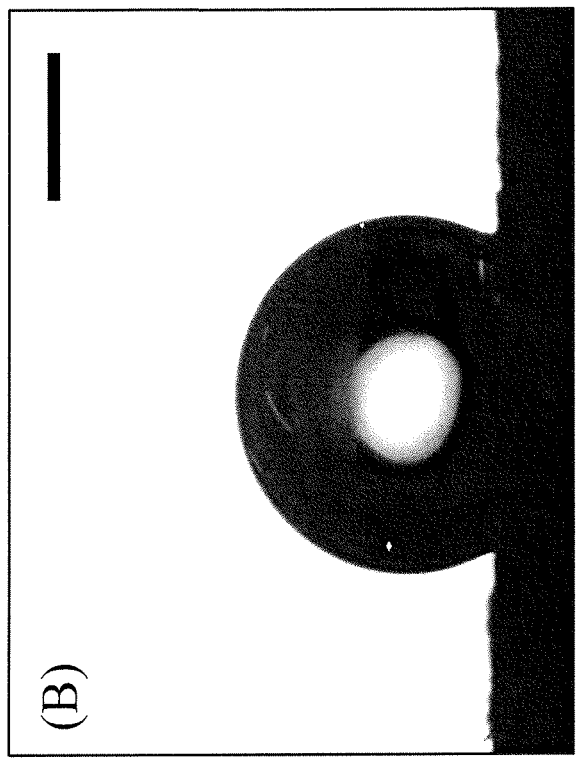
Figure 16:
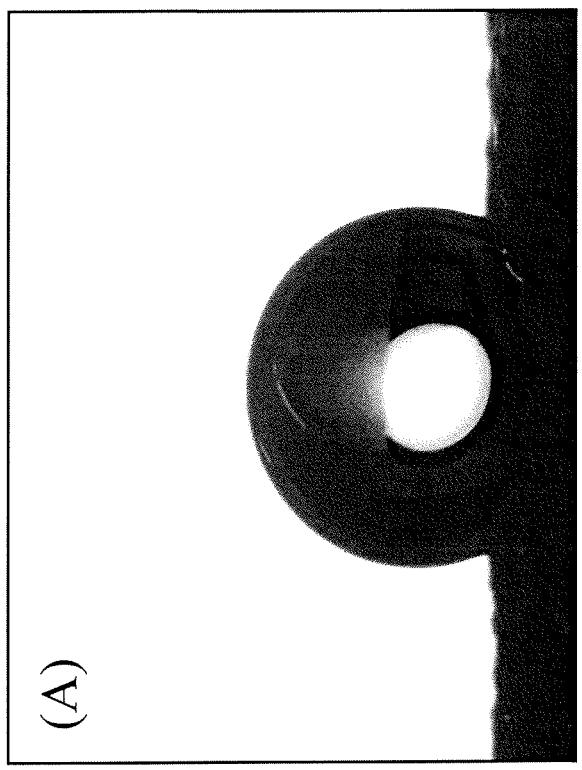

FIG. 16 are representative contact angle micrograph of (A) $D_1N_2J_{1.5}$PCL10 foam at RT and (B) $D_1N_2J_{1.5}$PCL10 foam at 45° C.

Figure 17:
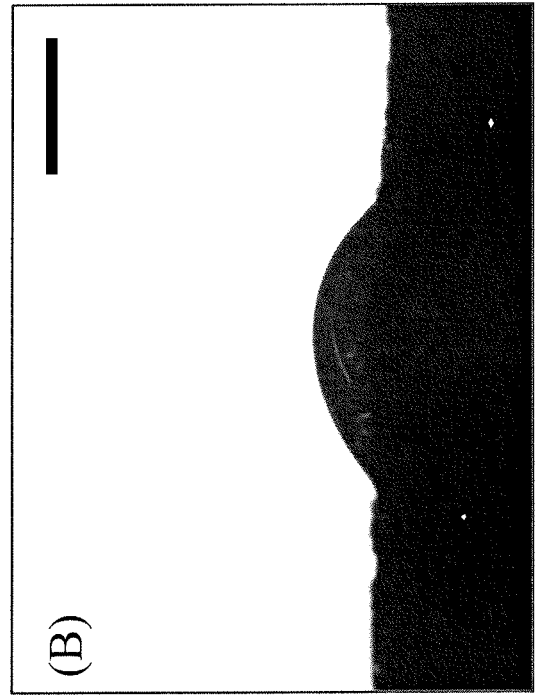
Figure 17:
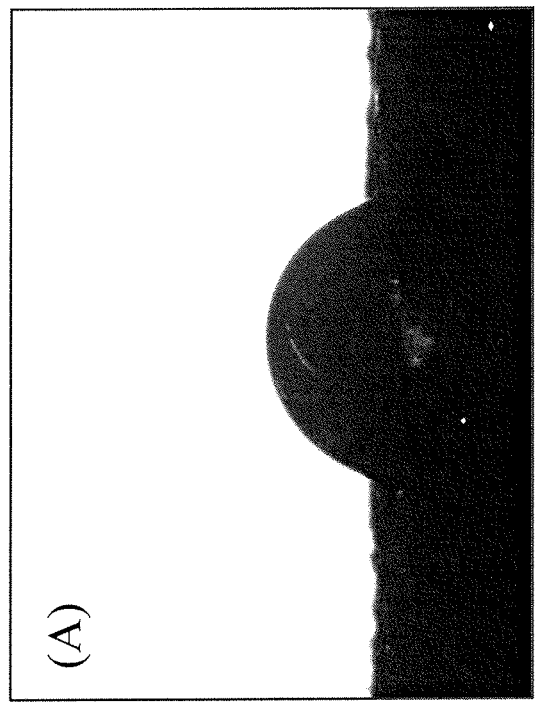

FIG. 17 are representative contact angle micrographs of (A) $D_1N_2J_{1.5}$PCL10 foam at RT and (B) $D_1N_2J_{1.5}$PCL10 foam at 45° C. after 20 min of placing the water droplet on the surfaces of the samples. Scale bar represents 1.0 mm.

Figure 18:
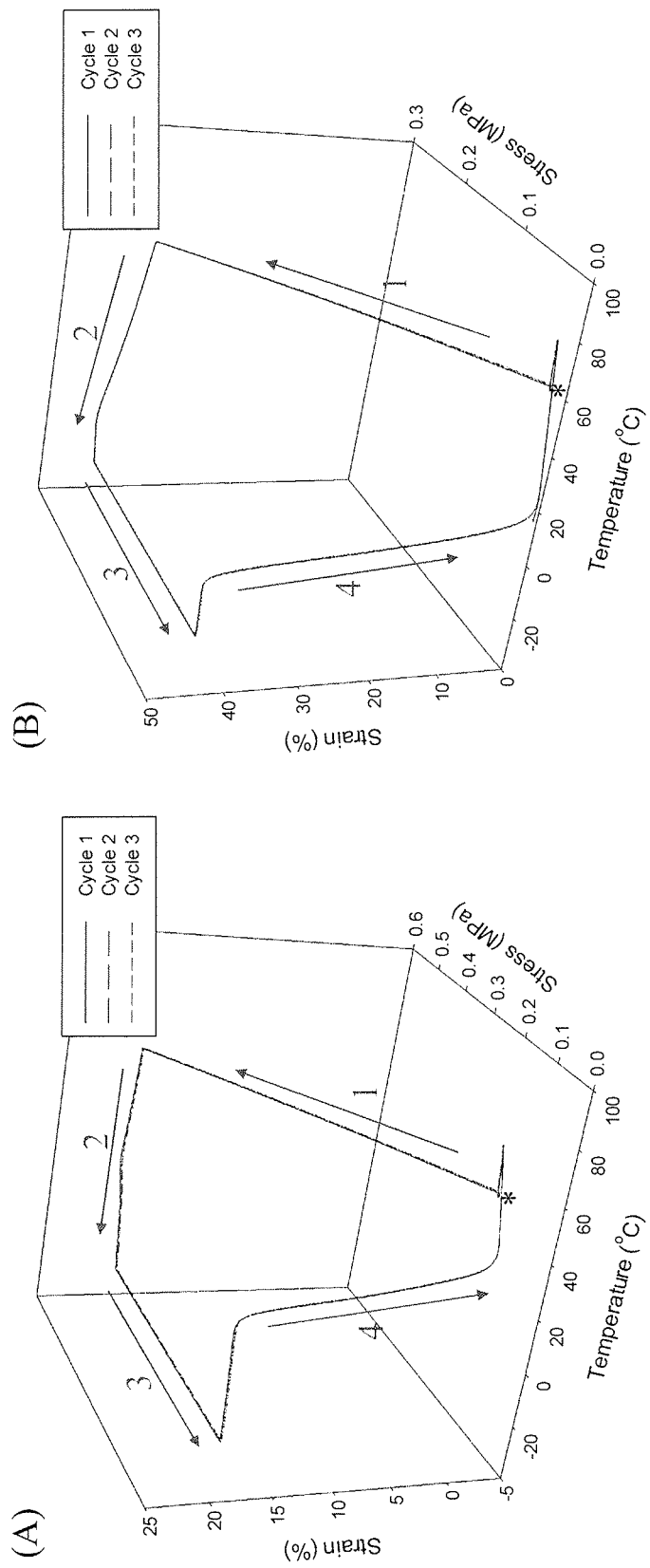

FIG. 18 are triple shape memory characterizations of (A) $D_1N_2J_{1.5}$ film and (B) $N_2J_1$ film using one-step fixing. The beginning of the cycles are marked by the asterisk. Samples were deformed at 65° C. (deformation), cooled to −20° C. and unloaded (fixing), followed by continuous heating to 80° C. (recovery). The arrows denote the various stages, specifically (1) deformation, (2) fixing, (3) unloading, and (4) recovery. One step recovery of both samples indicate dual shape memory behavior.

Figure 19:
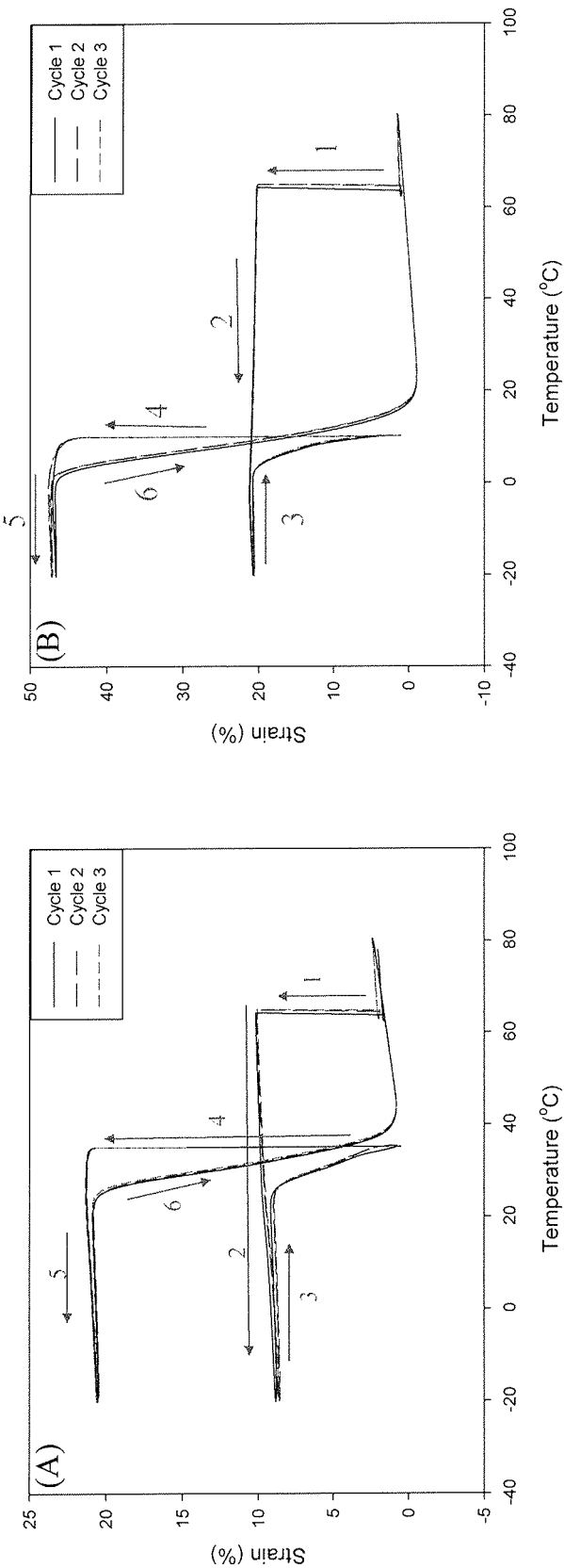

FIG. 19 are triple shape memory characterizations of (A) $D_1N_2J_{1.5}$ film and (B) $N_2J_1$ film using a two-step fixing method. Samples were deformed at 65° C., cooled to −20° C. and unloaded ($1^{st}$ fixing), heated to an intermediate temperature and deformed again, cooled to −10° C. ($2^{nd}$ fixing), followed by continuous heating to 85° C. (recovery). The beginning of the cycles are marked by the asterisk. The arrows denote the various stages of a shape memory cycle; specifically (1) deformation, (2) $1^{st}$ fixing, (3) $1^{st}$ unloading, (4) $2^{nd}$ fixing, (5) $2^{nd}$ unloading, and (6 and 7) recovery. In both cases, sample completely recovered after heating to an intermediate temperature indicating dual shape memory properties of epoxy films.

DETAILED DESCRIPTION OF THE INVENTION

Figure 1:
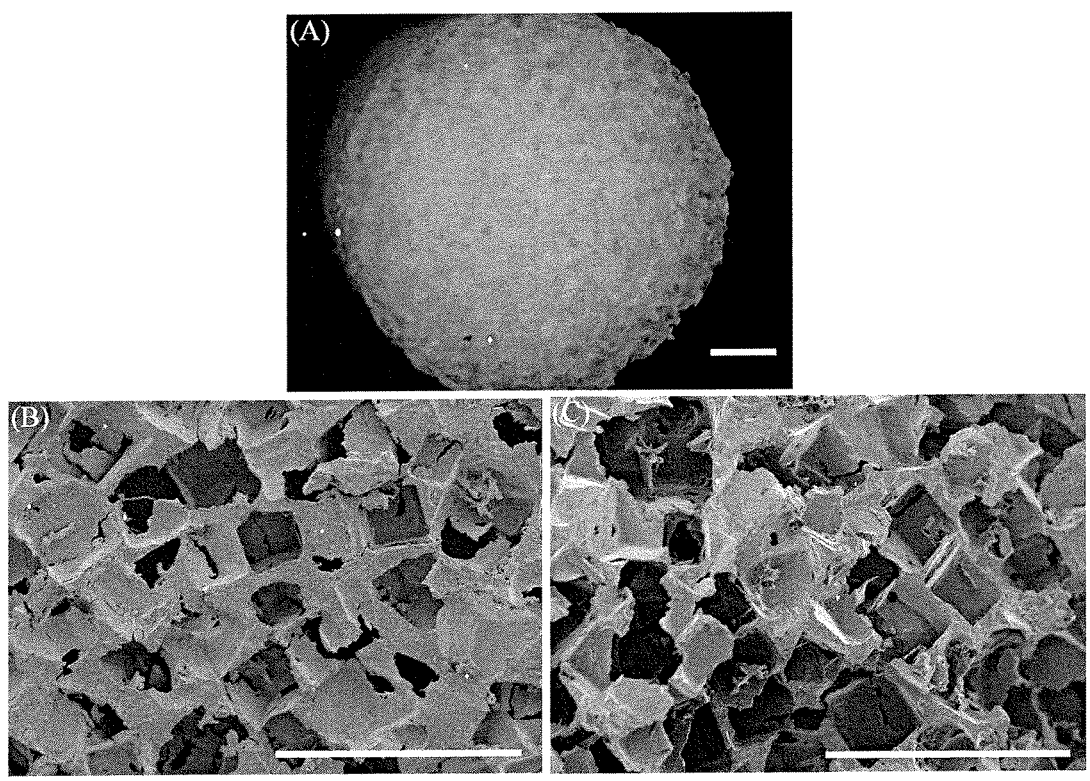
FIG. 1 is an optical micrograph and a SEM micrograph of cryofractured (A,B) $N_2J_1PCL10$ and (C) $D_1N_2J_{1.5}PCL10$ foam cross section. Scale bars represent 1.0 mm.

Referring now to the drawings, wherein like reference numerals refer to like parts throughout, there is seen in FIG. 1 highly porous, interconnected foams fabricated according to the present invention.

Figure 2:
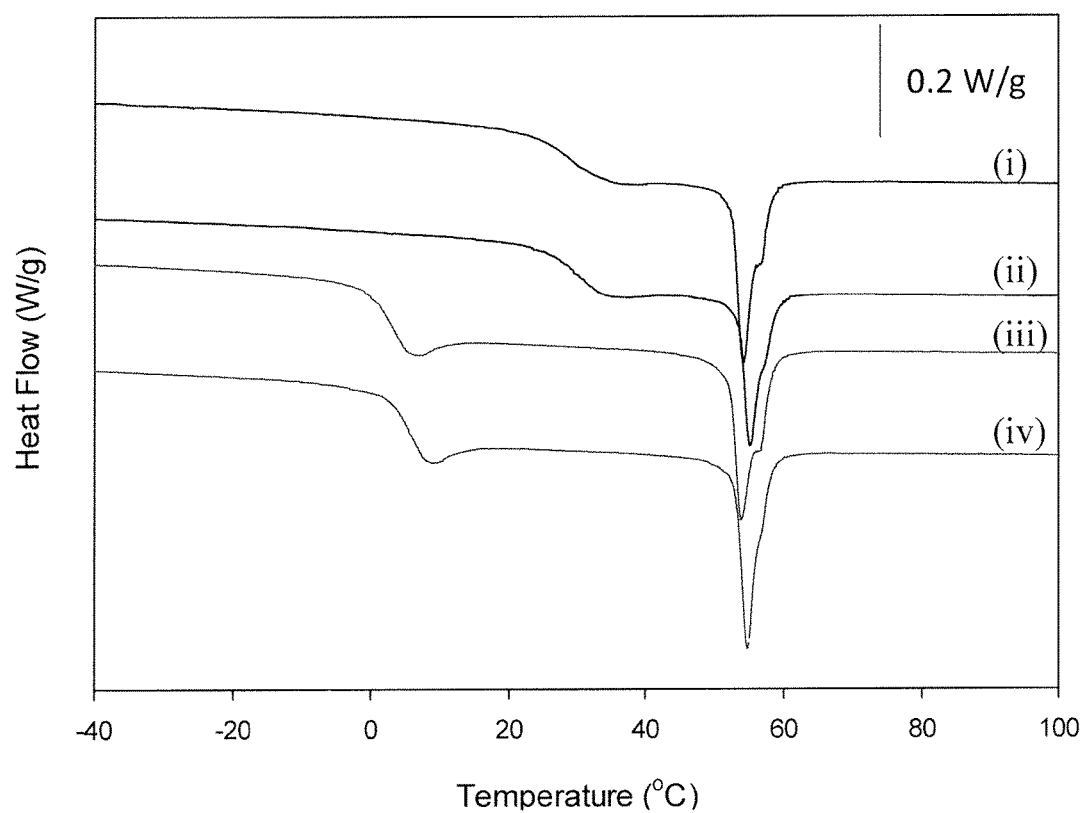
FIG. 2 are DSC thermograms ($2^{nd}$ heating cycle) of (i) $D_1N_2J_{1.5}PCL10$ film, (ii) $D_1N_2J_{1.5}PCL10$ foam, (iii) $N_2J_1PCL10$ film and (iv) $N_2J_1PCL10$ foam. Heating rates were 10° C./min and 5° C./min for heating and cooling, respectively.

SEM analysis of the cryofractured cross-sections of $N_2J_1$PCL10 and $D_1N_2J_{1.5}$PCL10 foams in FIG. 1(B) and FIG. 1(B) reveals both foams have an interconnected porous architecture that is cuboidal in morphology. This cuboidal morphology is dictated by the cuboidal structure of the salt particles. The size and shape of the porous architecture can be therefore tuned by using porogens with different sizes and morphologies. The micrographs in FIG. 1 also show the high porosity of the foams, which was determined to be ~73% by microtomography. Such high porosity enables high compressibility and shape change capability of the foams compared as characterized and discussed below. Thermal Characterization TGA thermograms of $D_1N_2J_{1.5}$PCL10 and $N_2J_1$PCL10 are provided in FIG. 11. The final weight fraction of both the film and the foam are the same in both compositions. Given that salt doesn't degrade in the prescribed temperature range (as shown in FIG. 10), this indicates that salt was completely extracted from the foam. DSC experiments were conducted to study the phase transition temperatures of the foams as discussed in what follows. Second heating DSC traces of $D_1N_2J_{1.5}$PCL10 and $N_2J_1$PCL10 as both foams and films are shown in FIG. 2. Both compositions showed two well-separated transitions: a step-like transition at lower temperature followed by a sharp peak at higher temperature which correspond to the $T_g$ of the epoxy-rich phase and the melting transition of the semi-crystalline PCL phase, respectively. As a wide window in between two transitions is necessary for triple shape memory behavior this was observed for both composites. The epoxy $T_g$ increased as DGEBA was used in the formulation while the PCL melting transition remained relatively unaffected. This indicates that the PCL and epoxy phases are well separated from each other as explained previously in the Methods section. The $D_1N_2J_{1.5}$PCL10 foam exhibited a glass transition at 29.2° C. and a melting transition at 51.9° C. whereas the $N_2J_1$PCL10 foams showed a glass transition at 5.3° C. and a melting transition of 54.7° C. Importantly, all composites featured a latent heat of fusion for PCL phase about 10 times smaller than that of pure PCL, indicating that the actual weight fraction of PCL in the composite is ~10% (DSC traces of neat $D_1N_2J_{1.5}$, neat N2J1 and pure PCL are available in FIG. 13). Moreover, both the $T_g$ of epoxy and the melting transition of the PCL were observed to be slightly higher in the foam form when compared to films. This may be due to slower heat transfer kinetics in the foams.

Dynamic Mechanical Analysis

Figure 3:
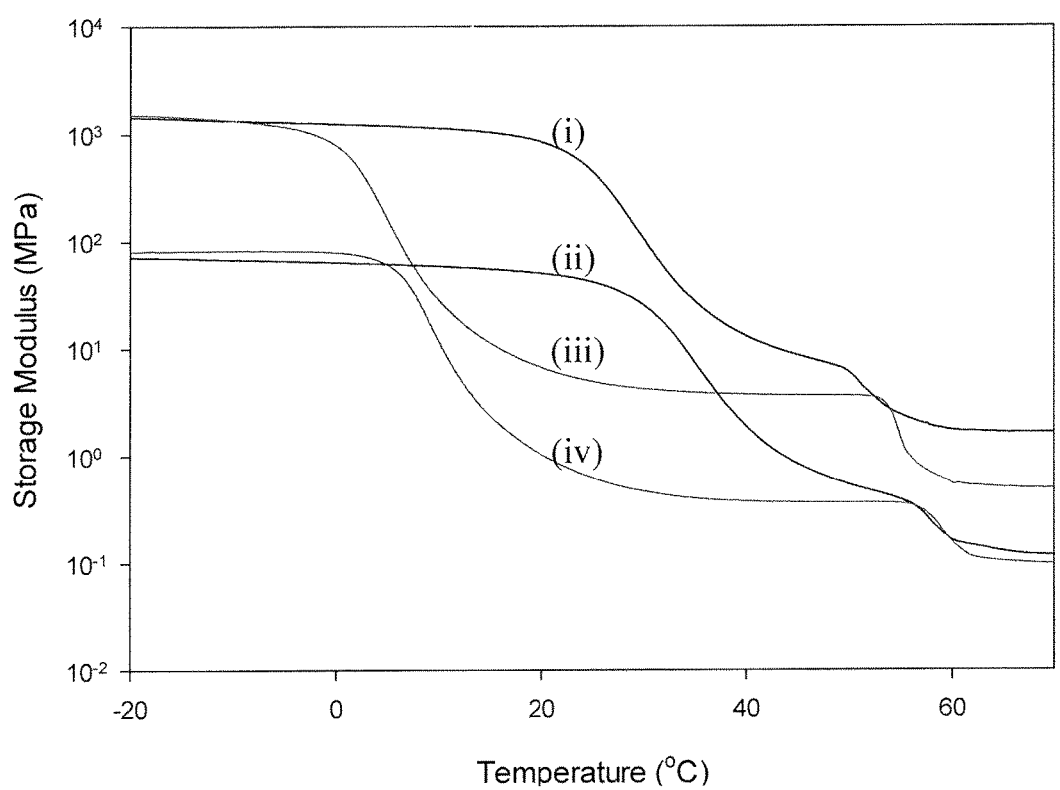
FIG. 3 are tensile storage modulus (E') traces of (i) $D_1N_2J_{1.5}PCL10$ film, (ii) $D_1N_2J_{1.5}PCL10$ foam, (iii) $N_2J_1PCL10$ film and, (iv) $N_2J_1PCL10$ foam.

To understand viscoelastic properties of the TSMCs and to provide perspective for the succeeding "Dual Shape" and "Triple Shape" SM cycles, dynamical mechanical analysis of each composite was conducted. FIG. 3 shows the temperature dependence of storage modulus of the $D_1N_2J_{1.5}$PCL10 and $N_2J_1$PCL10 composites for both foam and film forms. The corresponding loss tangent profiles are available in FIG. 14. Both composites showed two transitions, which is in agreement with DSC results. Both foams (traces ii and iv) and films (traces i and iii) exhibited high modulus plateaus at low temperature, followed by an intermediate plateau between the epoxy $T_g$ and the PCL melting transition and finally a third rubbery plateau above the PCL Tm, where the material exists as an epoxy rubber with an encapsulated liquid PCL phase. The two distinct transition temperatures observed by both DSC and DMA, along with three modulus-temperature plateaus observed by DMA were all prerequisites to achieve triple shape behavior. Three modulus plateaus were not observed (only two were) for epoxy samples without PCL as illustrated in FIG. 15.

In comparing films with foams, FIG. 3 shows that the apparent modulus of the foam is more than one order of magnitude lower than the film, a finding expected due to high porosity of the foam. Because of this lower modulus, the foams require significantly less force to be deformed and feature much higher compressibility relative to the film with the same composition. Table 1 summarizes the thermal properties of the composites determined by DSC ($2^{nd}$ heating cycle) and DMA. The moduli of the composites at 20, 45 and 75° C. are reported in this table. In contrast to the $N_2J_1PCL10$ foam which is in the intermediate rubbery plateau at 20° C. with a storage modulus of 1.04 MPa, the $D_1N_2J_{1.5}PCL10$ foam is very stiff at 20° C. with a modulus of 50.1 MPa. Therefore, the $D_1N_2J_{1.5}PCL10$ foam is a better candidate to serve as a triple shape memory foam since it has both transitions above RT and the ability to fix the epoxy matrix phase and not recover at RT.

uniaxially compressed to 20% strain at 65° C., cooled to −20° C. and unloaded to fix the temporary shape. For recovery, the samples were then continuously heated to 80° C. at 2° C. min$^{-1}$. Both foams showed a two-step recovery revealing triple shape memory behavior. The first broad recovery takes place as the foam is heated above the $T_g$ of the epoxy followed by a second sharp recovery by heating above the PCL Tm. The onset points for both recoveries in the foams were located at slightly higher temperatures compared to the films. Moreover, the films showed a sharper $1^{st}$ recovery compared to foams. Both of these phenomena are again attributed tentatively to slower heat transfer in the foams associated with the open cell morphology, though there is no direct proof of that. It is important to note that in

TABLE 1

| Sample | Tg (° C.)$^a$ | Tg (° C.)$^b$ | Tm (° C.)$^a$ | Tm (° C.)$^b$ | ΔHm, PCL (J/g)a | E@20° C. (MPa)b | E@45° C. (MPa)b | E@75° C. (MPa)b |
|---|---|---|---|---|---|---|---|---|
| $D_1N_2J_{1.5}PCL10$ Foam | 29.2 | 29.1 | 55.1 | 60.6 | 5.0 | 51.0 | 0.54 | 0.12 |
| $D_1N_2J_{1.5}PCL10$ Film | 29.0 | 23.4 | 54.2 | 54.9 | 5.9 | 847.0 | 8.62 | 1.68 |
| $N_1J_2PCL10$ Foam | 5.3 | 5.7 | 54.7 | 57.2 | 6.0 | 1.04 | 0.37 | 0.10 |
| $N_1J_2PCL10$ Film | 2.6 | 0.7 | 53.9 | 53.7 | 6.5 | 14.4 | 7.94 | 1.09 |
| $D_1N_2J_{1.5}$ Film | 27.2 | 21.6 | — | — | — | 821.4 | 2.75 | 1.86 |
| $N_1J_2$ Film | 3.3 | 0.2 | — | — | — | 1.43 | 0.71 | 0.75 |
| PCL | — | — | 55.1 | — | 59.1 | — | — | — |

$^a$Determined from DSC
$^b$Determined from DMA
—: Not applicable

Wetting Behavior

Representative contact angle measurements and micrographs (and average contact angle) of (for the SMP foams and films are provided in FIG. 4. The $D_1N_2J_{1.5}PCL10$ film was found to feature a contact angle several degrees larger than the neat $D_1N_2J_{1.5}$ film as reported in FIG. 4(A) and FIG. 4(B). This indicates that the epoxy/PCL composite has a moderate hydrophobic surface that is more hydrophobic than neat epoxy yet less hydrophobic than PCL. The contact angle of the $N_1J_2PCL10$ film was also measured to be slightly higher than that of the neat $N_2J_1$ film, though both were significantly lower (more hydrophilic) than the DGEBA-based epoxy compositions ($D_1N_2J_{1.5}PCL10$). Interestingly, the $D_1N_2J_{1.5}PCL10$ foam retained the water droplet on its surface while the water droplet permeated into the $N_2J_1PCL10$ foam in less than 30 s as shown in FIGS. 4(C) and 4(D), respectively. This finding may be due as a result of the more hydrophobic DGEBA aromatic diepoxide making the composite relatively more hydrophobic. Even when heated above the $T_g$ of the epoxy phase at 45° C., water did not permeate into the rubbery $D_1N_2J_{1.5}PCL10$ foam within the observation time of 20 min, as indicated in FIGS. 16, 10 and 11. These results suggest that higher contact angle (hydrophobicity) of the $D_1N_2J_{1.5}PCL10$ foam arose from higher hydrophobicity of chemical components rather than different mechanical properties of the foams at RT.

Quantitative Characterization of Triple Shape Memory Behavior

The same DMA used above for viscoelastic property measurements was used under the "Control Force" mode to analyze the dual and triple shape memory behavior of the foams. FIG. 5 shows the results for the one-step fixing method for all films and foams. Starting at the point indicated with the asterisk (*) symbol, the foams were first absence of a phase (PCL) with a second transition the epoxy samples showed simple one step recovery events, starting at their $T_g$'s, consistent with dual shape memory behavior. Shape memory characterization revealed that both films and foams have repeatable shape memory responses as the three consecutive cycles overlap. This suggests that the pore walls in the foams bend and do not break when subjected to compression, as the loading traces for each cycle are identical. The porous architecture dictates the type of pore wall deformation that occurs, as has been previously investigated for polyurethane-based shape memory foams. Given the porous architecture is not compromised during shape fixing or recovery, it can be expected that these foams would perform well cyclically under significantly more loading cycles.

To further characterize the triple shape memory behavior of the foam, a two-step fixing method was developed. The result of such triple shape memory testing is provided in FIG. 6 for all foams and films. A circular disc of the foam was heated to 65° C. and uniaxially compressed to 20% while maintaining the compressive deformation, the sample was then cooled to −20° C. to induce crystallization of the PCL-rich phase, immobilizing the chains and fixing the deformation (for different modulus plateaus, refer to FIG. 3). Each sample was then heated to approximately 35° C., further compressed to 40% strain and fixed by cooling to −20° C. during which the epoxy-rich phase was vitrified. For recovery, each sample was heated continuously to 80° C. where the sample completely recovered to its original strain in a two-step fashion as the epoxy and PCL phases recovered sequentially. Such two step recovery of the sample during continuous heating indicates triple shape memory behavior with recovery from shape (A) to shape (B) (prescribed during fixing) to shape (C). Without a second transition, neat epoxy samples, however, exhibited dual shape memory behavior and were not capable of holding the second temporary shape. While a compressive strain of 40% was programmed for triple shape memory characterization, these foams are capable of fixing and recovering strains of 70% or greater, which may be necessary for biomedical applications where large expansion ratios are required.

Reported in Table 2 are the calculated fixing and recovery ratios of both composites as film and foam using the equation explained in the Methods Section. All samples showed a good fixing of temporary shape (A). However, the fixing of temporary shape (B) in both foams were higher than the corresponding films. A simple explanation exists: For these experiments, common unloading temperatures of 10° C. (lower $T_g$ epoxy) and 35° C. (higher $T_g$ epoxy) were selected to examine the fixing of shape B for both films and foams. With the films recovering slightly at this temperature (due to lower recovery temperature) they were observed to feature a lower fixing degree. Had lower unloading temperatures been selected for the films, the observed fixing of shape B would have been higher. However, the conditions were kept constant between the two types of samples. The fixing ratios—how much of the programmed deformation is maintained upon unloading—were above 99% for the foams. Recovering ratios—how much of the programmed deformation was recovered upon heating—were also above 99% for the foams. Such high fixing and recovery ratios indicate outstanding ability of the foam to deform to 2 separate shapes and recover upon heating. These appear to be the highest fixing and recovery ratios for any triple shape memory systems reported in literature.

To visually demonstrate the triple shape memory behavior of the foam, a rectangular piece of $D_1N_2J_{1.5}PCL10$ foam (with dimensions of 22.4 mm (length)×5.3 mm (width)×3.8 mm (thickness)) was equilibrated at 80° C. in an isothermal oven for 10 min, sandwiched between two glass slides and compressed to ~70% strain. The sample was then immediately placed in a freezer at −17° C. to fix the $1^{st}$ temporary shape. The compressed foam was deformed to a "C" shape and again cooled to −17° C. to fix the $2^{nd}$ temporary shape (See method section for details.). FIG. 7 shows triple shape recovery of the sample uncurling from the $2^{nd}$ temporary shape (shape (A)) to the $1^{st}$ temporary shape (shape (B)) after heating to 40° C. and then expanding to the permanent shape (shape (C)) after heating to 80° C.

Conclusions

A new family of epoxy-based foams featuring triple shape memory behavior have been designed, fabricated, and tested using a simple, inherently scalable method. Two high porosity foams with drastic differences in hydrophobicity and mechanical properties at RT were fabricated and characterized. Both foams exhibited two well-separated transitions which are attributed to the $T_g$ of epoxy-rich phase followed by the melting transition of the PCL-rich phase. Wetting characteristics pertinent to medical applications were quite distinct among the compositions, with DGEBA-based epoxies being more hydrophobic. Dual and triple shape memory characterization of the foams revealed excellent capability of fixing two independent temporary shapes and sequentially recovering upon heating. Given the simplicity of fabrication of the composites and low costs/good mechanical properties of the foams, the foams are amenable to mass production for use in applications spanning healthcare, aerospace, and packaging industries where geometrically complex actuation may be required.

EXAMPLE

Materials

Diglycidyl ether of bisphenol-A (DGEBA) (Mw=340 g mol-1), an aromatic diepoxide monomer, neopentyl glycol diglycidyl ether (NGDE) (Mw=216 g mol-1), an aliphatic diepoxide monomer, a polyether diamine, polypropylene glycol) bis(2-aminopropyl ether) (Jeffamine® D230) (Mw=230 g mol-1), and poly(ε-caprolactone) (PCL) (Mw =10 000 g mol-1) were purchased from Sigma-Aldrich. All the materials were used as received. Sodium chloride was also purchased from Sigma-Aldrich and used for the salt template. Prior to salt fusion, salt particles were sequentially sieved, and particles with a 300-500 μm diameter were isolated for further use.

Fabrication of the Foams

FIG. 8 provides a schematic illustration for preparation of "Triple Shape Memory Composite Foams." The composite was prepared by copolymerizing DGEBA/NGDE mixtures of varying proportions in the presence of a stoichiometric amount of JD230 as the crosslinker following previously reports. Epoxy monomers (DGEBA and NGDE) and PCL were first vigorously stirred at 75° C. for 20 min until a clear, homogenous blend was achieved (A). Then the blend was cooled to room temperature, where it remained a single phase liquid, after which the crosslinker (JD230) was added (B). The blend was then stirred for another 2-3 min37. The

TABLE 2

| Sample | Fixing Method | $R_f$ (a) % | $R_f$ (b) % | $R_r$ (a → b) % | $R_r$ (b → c) % | $R_r$ (a → c) % |
|---|---|---|---|---|---|---|
| $D_1N_2J_{1.5}$PCL10 Foam | One Step | 97.1 | — | — | — | 99.1 |
| | Two Step | 97.0 | 103.8 | 1.9 @35° C. 118.4@53.9° C. | 99.4 | 99.7 |
| $D_1N_2J_{1.5}$PCL10 Film | One Step | 99.6 | — | — | — | 96.1 |
| | Two Step | 99.5 | 64.3 | 70.1 @35.0° C. 97.9 @46.0° C. | 86.3 | 96.2 |
| $N_2J_1$PCL10 Foam | One Step | 95.5 | — | — | — | 99.4 |
| | Two Step | 94.4 | 101.4 | 0.4 @10° C. 130.8 @32.5° C. | 96.7 | 98.0 |
| $N_2J_1$PCL10 Film | One Step | 99.9 | — | — | — | 96.8 |
| | Two Step | 99.9 | 70.6 | 63.3 @10° C. 106.4 @27.8 | 93.5 | 98.1 |
| $D_1N_2J_{1.5}$ Film | One Step | 99.7 | — | — | — | 97.0 |
| | Two Step | 99.8 | 7.2 | — | — | 97.3 |
| $N_2J_1$ Film | One Step | 99.9 | — | — | — | 98.6 |
| | Two Step | 99.9 | 6.1 | — | — | 98.8 | product, a low viscosity blend, was then poured into an interconnected salt template (C) and was kept at room temperature (RT) for 10 min, followed by pulling light vacuum for an additional 10 min to allow the blend to completely diffuse into the salt template and replace the air (Details on preparation of the interconnected salt template are provide in FIG. 9).

The product was then cured at RT for 24 h followed by curing at 40° C. for an additional 3 days, during which time the initially miscible system phase separated into two phases, one that is epoxy-rich and one that is PCL-rich. This well-known process, Polymerization Induced Phase Separation (PIPS), has been previously reported. The fully cured samples were then immersed in water at 40° C. for 48 h to extract the salt, yielding interconnected foams with a porosity of c.a. 73% determined by microtomogrpahy (MicroCt image of the foam is available in FIG. 10). The samples are named as DxNyJzPCL10 where x, y and z indicate the molar ratio of DGEBA, NGDE and JD230, respectively. The following two compositions were prepared using the aforementioned method: $D_1N_2J_{1.5}PCL10$ and $N_2J_1PCL10$. Even though both of these samples were prepared using the same method, the latter is very soft and rubbery while the former is stiff at RT. For comparison, films with similar compositions were prepared following a conventional method. Briefly, after adding the crosslinker, the blend was poured into a ~1.0 mm deep mold and cured following the same protocol for the foams.

In what follows, characterization of both foams and their corresponding films with the same composition is reported. Optical micrographs and SEM micrographs of a cryofractured foam's cross section are provided in FIG. 1.

Thermal Characterization

The thermal stability and salt content of fully cured foams was studied by thermogravimetric analysis (TGA) using a TA Q500 TGA instrument under a constant nitrogen purge. For all samples, a small amount of material ranging from 10-20 mg was loaded on the TGA pan and heated at a fixed rate of 10° C. $min^{-1}$ to 600° C. while recording the sample mass as a function of temperature. Given that NaCl doesn't degrade or sublime in the prescribed temperature range, the final mass remaining of the both foams and films should be the same if the salt extraction was complete (See FIGS. 11 and 12). Thermal properties of the composites were characterized using Differential Scanning Calorimetry (DSC) anticipating relatedness to the triple shape memory behavior studied later. DSC experiments were conducted using a Q200 (TA Instrument) equipped with a refrigerated cooling system (RCS). Samples of mass 3-5 mg were encapsulated in a Tzero aluminum pan. Each sample was then equilibrated at −80° C., ramped to 120° C., cooled back to −80° C., and finally heated to 120° C. All heating and cooling rates were 10 and 5° C. $min^{-1}$, respectively. Tg and melting transition of the samples were determined as the middle point of the step transition and the melting peak transition of the DSC second heating runs, respectively.

Foams Interconnected Structure

The porous structure of the foams was studied using a JEOL JSM-5600 scanning electron microscope (SEM). To preserve the inner structure of the foam, a rectangular sample was first double notched on the sides, immersed in liquid nitrogen and immediately broken in half. The cryofractured sample was then sputter coated (make/model) with gold for 45 s prior to SEM imaging.

Dynamic Mechanical Analysis

To study thermomechanical properties of the foams a Q800 Dynamic Mechanical Analyzer (DMA) (TA Instruments, Inc.) was used. Rectangular foam samples (typical dimensions of 9.0 mm (length)×5.0 mm (width)×3.0 mm (thickness) were loaded under tension and oscillatory deformation with an amplitude of 10 μm, a frequency of 1 Hz and with a "force track" (ratio of static to dynamic force) of 108% applied. Samples were equilibrated and held isothermally at −40° C. for 20 min, then heated to 80° C. at a rate of 2° C. min-1. For comparison, the same experiments were conducted on ¼ scale ASTM Type IV dogbone (ASTM D63) with a typical thickness of 1.0 mm. The Tg and melting transition temperatures were determined as the onset of tensile modulus drop. Shape programming (deformation) temperatures for subsequent shape memory testing were selected to be within the rubbery plateau regions of the storage modulus. Details of this shape memory characterization are explained below.

Wettability Study

Static contact angle measurements of foams and films were studied with a Rame-Hart 250-F1 standard goniometer. A droplet of water was placed on a clean, dry surface of the sample and the contact angle was immediately measured. For each compositional group, the experiment was replicated 3 times on 3 individual samples (total number measurements: 9). To analyze the effect of apparent modulus of the foam on contact angle, the same experiment was conducted for the $D_1N_2J_{1.5}PCL10$ at RT and 40° C. at which the foam had stiff and rubber like characteristics, respectively. All samples were stored at RT for at least 48 h prior to testing.

Shape Memory Characterization

Both dual and triple shape memory properties of the composites were characterized with the same Q800 dynamic mechanical analyzer (DMA) mentioned above, but in "Force Control" mode. Two different fixing protocols with distinct thermomechanical histories were conducted, as explained below.

One Step Fixing Method

First, triple shape behavior was explored using a single fixing method. A cylindrical disc sample was compressed to 20% strain at 65° C. (above both thermal transitions) by ramping the force at 0.1 N.$min^{-1}$. The sample was then cooled to −20° C. at 2° C.$min^{-1}$ while holding the applied force constant to induce both PCL crystallization and epoxy vitrification. After an isothermal step of 5 min, the compression force was gradually unloaded at 0.1 N.$min^{-1}$ to the preload force (0.005 N) to fix the temporary shape. In the final step, the sample was heated to 80° C., completing the shape memory (SM) cycle. This thermomechanical cycle was replicated 2 more times on the same sample to ensure reproducibility of the results. As a control experiment, shape memory behavior of films in tension was explored.

Two Step Fixing Method

For comparison, another shape memory cycle was designed utilizing two fixing steps, following a method developed by us previously. (Luo, Mather 2010) A cylindrical disc of the foam was heated to 65° C. and uniaxially compressed to a strain of 20%. While maintaining the compressive deformation, the sample was then cooled to −20° C. to promptly induce crystallization of the PCL-rich phase, immobilizing the chains and fixing the deformation. The PCL phase having been crystallized, the sample was then heated to an intermediate temperature above the Tg of epoxy (35° C. for $D_1N_2J_{1.5}PCL10$ and 10° C. for $N_2J_1PCL10$), further uniaxially compressed to a strain of 40% and fixed by cooing to −20° C., upon which the epoxy-rich phase was vitrified. (As will be described in Results, the Tg and melting temperature (Tm) of both composites are provided in Table 1.) For recovery of both fixed strains, the sample was heated continuously to 80° C. This thermomechanical cycle was replicated two additional times on the same sample to ensure reproducibility of the results. The same protocol was applied to the films in tension mode.

The fixing ratios, Rf, and recovery ratios, Rr were quantified following equations:

$$R_f(x) = \frac{\varepsilon_x}{\varepsilon_{x,Load}}$$

$$R_r(x) = \frac{\varepsilon_x - \varepsilon_{y,rec}}{\varepsilon_x - \varepsilon_y}$$

where $\varepsilon x,load$, $\varepsilon x$ and $\varepsilon y,rec$ represent the strain before and after unloading and the strain after recovery for shape x, respectively (x can be strain at 80° C., 35° C., 10° C. or −10° C.; the same holds for y). For strain at 80° C., $\varepsilon c$ is simply the starting strain. For intermediate recovery, strains at two temperatures were calculated: one at 35° C. or 10° C. and the other at the temperature where strain differentiation with respect to temperature (d$\varepsilon$/dT) was the lowest; i.e. the intermediate plateau.

To visually demonstrate the shape memory behavior of the foam, a protocol similar to "Quantitative Shape Memory Characterization-Two Step fixing method" was used, as explained below. A rectangular $D_1N_2J_{1.5}PCL10$ foam was equilibrated at 80° C. in an isothermal oven for 10 min, sandwiched between two glass slides and compressed to ~70% strain. The sample was then immediately placed in a freezer at −17° C., while holding the compressive force, and kept isothermal for 10 min to fix the 1st temporary shape. To program the second temporary shape, the already compressed foam was heated to 40° C., curled to a "C" shape, and placed in a freezer at −17° C. For sequential recovery the sample was first heated to 40° C. triggering recovery of the 1st shape, followed by heating to 80° C. triggering recovery of the second shape.

What is claimed is:

1. A triple shape memory polymer, comprising a foam having an epoxy phase with a glass transition temperature and a thermoplastic phase having a melting temperature that are intermixed to form a continuous phase, wherein the continuous phase defines walls having a thickness of between 1 and 100 micrometers and pores having a diameter of between 100 and 1000 micrometers.

2. The polymer of claim 1, wherein the glass transition temperature of the epoxy phase is lower than the melting temperature of the thermoplastic phase.

3. The polymer of claim 2, wherein the epoxy comprises a copolymer.

4. The polymer of claim 3, wherein the copolymer comprises an aromatic diepoxide monomer and an aliphatic diepoxide monomer.

5. The polymer of claim 4, wherein the aromatic diepoxide monomer comprises diglycidyl ether of bisphenol-A (DGEBA).

6. The polymer of claim 5, wherein the aliphatic diepoxide monomer comprises neopentyl glycol diglycidyl ether (NGDE).

7. The polymer of claim 4, wherein the thermoplastic phase comprises poly($\varepsilon$-caprolactone)(PCL).

8. The polymer of claim 1, further comprising a cross-linker.

9. The polymer of claim 8, wherein the cross-linker comprises a polyetheramine.

10. The polymer of claim 9, wherein the polyetheramine comprises poly(propylene glycol) bis(2-aminopropyl) ether.

11. A method of forming a triple shape memory polymer, comprising the steps of:
blending an aromatic diepoxide monomer and an aliphatic diepoxide monomer with a thermoplastic polymer;
blending a cross-linker into the aromatic diepoxide monomer, the aliphatic diepoxide monomer, and the thermoplastic polymer;
inserting the blended cross-linker, the aromatic diepoxide monomer, the aliphatic diepoxide monomer, and the thermoplastic polymer into a foam template;
curing the blended cross-linker, the aromatic diepoxide monomer, the aliphatic diepoxide monomer, and the thermoplastic polymer in the foam template; and
extracting the foam template to leave a triple shape memory polymer foam.

12. The method of claim 11, wherein the aromatic diepoxide monomer is diglycidyl ether of bisphenol-A (DGEBA), the aliphatic diepoxide monomer is neopentyl glycol diglycidyl ether (NGDE), and the thermoplastic polymer is poly($\varepsilon$-caprolactone)(PCL).

13. The method of claim 12, wherein the foam template comprises salt.

14. The method of claim 13, wherein the triple shape memory polymer foam comprises walls with a thickness of between 1 and 100 micrometers and pores having a diameter of between 100 and 1000 micrometers.

* * * * *